United States Patent
Oliver

[15] 3,683,135
[45] Aug. 8, 1972

[54] SIGNALING MECHANISM FOR GAUGES

[72] Inventor: Robert P. Oliver, Milford, Conn.

[73] Assignee: America Chain & Cable Company, Inc., New York, N.Y.

[22] Filed: Feb. 27, 1970

[21] Appl. No.: 15,083

[52] U.S. Cl. .................................... 200/56 R
[51] Int. Cl. ................................... G01d 13/26
[58] Field of Search....73/389; 177/70; 200/83 L, 56; 116/115.5, 129 B

[56] References Cited

UNITED STATES PATENTS 2,973,414  2/1961  Bossemeyer.................200/56

FOREIGN PATENTS OR APPLICATIONS 1,131,305  10/1968  Great Britain...............177/70
1,043,014  9/1966  Great Britain...............177/70

*Primary Examiner*—Donald O. Woodiel
*Attorney*—Pennie, Edmonds, Morton, Taylor and Adams

[57] ABSTRACT

A signaling mechanism for gauges having an indicating pointer movable along the dial of the gauge in response to a variable supplied to the gauge and a set pointer positionable along the dial at preselected values of the variable. The signaling mechanism includes a switch operable in response to sensing of the position of the indicating pointer. The switch itself is mounted for movement relative to the set pointer and positionable along the dial independently thereof for sensing the indicating pointer when the latter precisely coincides with the position of the set pointer.

13 Claims, 4 Drawing Figures

PATENTED AUG 8 1972　　3,683,135

INVENTOR.
ROBERT PATRICK OLIVER
BY
ATTORNEYS

PATENTED AUG 8 1972　　　　　　　　　　　3,683,135

INVENTOR.
ROBERT PATRICK OLIVER

BY

ATTORNEYS

SIGNALING MECHANISM FOR GAUGES

BACKGROUND OF THE INVENTION

In conventional pressure gauges having an indicating pointer movable in response to changes in pressure, it is conventional to provide a signaling mechanism for energizing an electrical circuit when a predetermined pressure is recorded by the gauge. Energization of the circuit may, in turn, control operation of a motor, pump or similar apparatus included in the system being monitored by the gauge.

With one type of signaling mechanism presently employed with gauges, a set pointer is provided and a switch controlling energization of the electrical circuit is connected to the set pointer. The switch includes a pick-up arm connected to the set pointer by a hairspring and located in the path of movement of the indicating pointer. The switch is adapted to be actuated upon physical contact of the indicating pointer with the pick-up arm. With this type of construction, the indicating pointer is free to move beyond the point of contact with the switch on the set pointer; but such movement is restrained by the physical contact with the switch. Also, this type of construction requires open contacts for the switch which promotes arcing between the contacts and thus causes deterioration. Further, the open contacts can become oxidized and thus adversely effect the reliability of the signaling mechanism.

In another type of signaling mechanism, as for example used on weighing scales, a reed switch having contacts enclosed in a glass envelope is employed. The reed switch is attached to the set pointer of the scale in place of any mechanical switch to energize the circuit. With a reed switch, the contacts are contained within an inert atmosphere inside the glass envelope; and opening and closing of the switch contacts are made responsive to the magnetic field of a magnet carried by the indicating pointer of the scale.

With the reed switch type of signaling mechanism, inaccuracies in the point of signaling tend to occur due to the idiosyncrasies of the reed switch and magnet. This is especially a problem in mass production. As a practical matter, no two reed switches have the identical operating characteristics and the same is true with the magnets which are used for actuating these switches. Thus, in mass production, the accuracy of the signaling mechanism is limited by the variances in the operating characteristics of the individual switches and magnets. In addition, with constructions of this type, the indicating pointer and set pointer, which are mounted for movement along the dial of the scale, most likely do not move in planes which are precisely parallel. Thus, the spacing between the reed switch on the set pointer and the magnet on the indicating pointer, when the two pointers overlie each other, will vary for different settings of the set pointer. This, in turn, will reduce the overall accuracy of the signaling mechanism.

SUMMARY OF THE INVENTION

In accordance with the teachings of the present invention, an improved signaling mechanism employing a reed switch control is provided. In construction, the reed switch is mounted on a vane separate from the set pointer and movable relative thereto. With this construction, the reed switch can be accurately positioned relative to the set position of the set pointer so that it will be actuated in response to the magnet on the indicating pointer when the latter precisely coincides with the set pointer. In addition to the above, the vane can be locked to the set pointer so as to maintain the set relationship between the reed switch and the set pointer upon movement of the latter to different settings along the dial. Also, where multiple switching circuits are required, multiple set pointers, each with its own separately mounted reed switch, are provided.

DESCRIPTION OF THE PREFERRED EMBODIMENT

Figure 1:
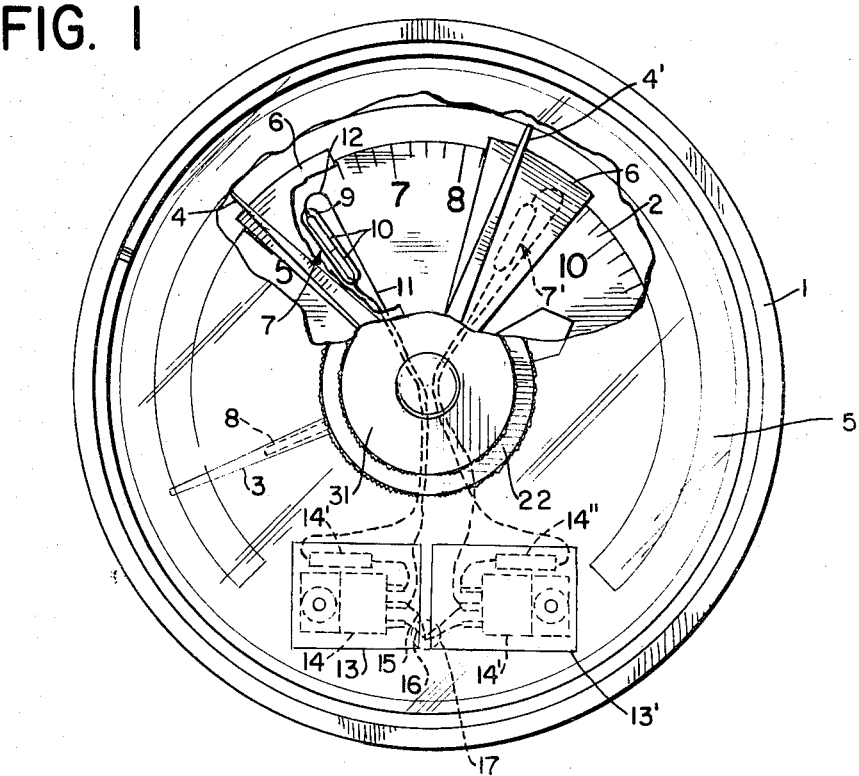
FIG. 1 is a plan view of a pressure gauge showing the improved signaling mechanism of the present invention.

In the drawings, there is shown a pressure gauge having an outer case structure 1, a front face with a dial 2 indicating pressure values, and an indicating pointer 3 movable along the dial in response to changes in pressure. In addition to the indicating pointer, two separate set pointers 4 and 4' are provided. One set pointer is used as a low limit pointer and the other as a high limit pointer. Typically, these pointers would be set at the outer limits within which the pressure in the system being monitored is to be maintained. The front of the gauge is enclosed by a lens 5.

In accordance with the teachings of the present invention, a separate signaling mechanism is provided for each of the set pointers. The following description will be made primarily with respect to one of the signaling mechanisms; however, it is to be understood that the other signaling mechanism is of the same construction and like parts thereof will be designated in the drawings by like reference numerals followed by the suffix prime (').

As shown in FIG. 1, a switch support member in the form of a vane 6 is provided for cooperating with the set pointer 4. A reed switch 7 is attached to the undersurface of the vane; and for actuating the reed switch, an actuating magnet 8 is secured to the undersurface of the indicating pointer 3. The magnet 8 is positioned at the same radial distance from the center of the dial as the reed switch carried by the set pointer. The vane 6 is disposed underneath the set pointer 4 and is radially shorter than the set pointer so as not to interfere with its operation. Both the vane 6 and set pointer 4 overlie the indicating pointer 3 with sufficient space being provided between each of these members to permit free movement of each past the others.

Figure 2:
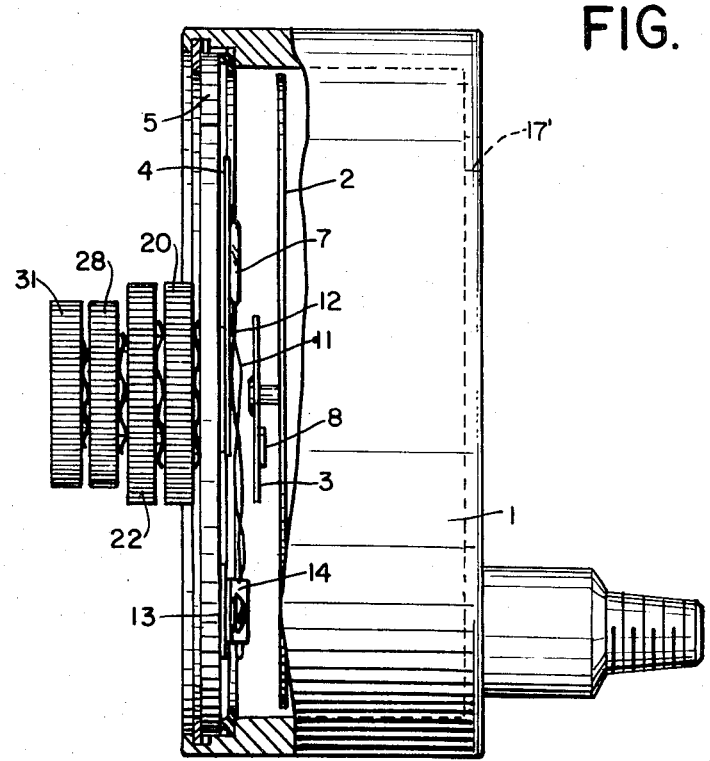
FIG. 2 is a side, cross-sectional view of the gauge shown in FIG. 1.

In construction, the reed switch includes a glass envelope 9 in which the contacts 10 of the switch are disposed. The contacts are connected outwardly of the glass envelope to conductors 11 and 12. These conductors are led back to a plate support member 13 which is secured to the underside of the lens 5. As shown in FIG. 2, the underside of the plate 13 carries a triode AC semiconductor switch 14 to which the reed switch, in series with a suitable resistor 14', is connected. From the triode, conductors 15 and 16 pass through an opening 17 in the dial of the gauge and exit through an opening 17' in the back for connection to a suitable load 18 which is to be controlled. The load may be a solenoid, motor, valve, regulator or other apparatus in the system being monitored by the gauge.

Figure 3:
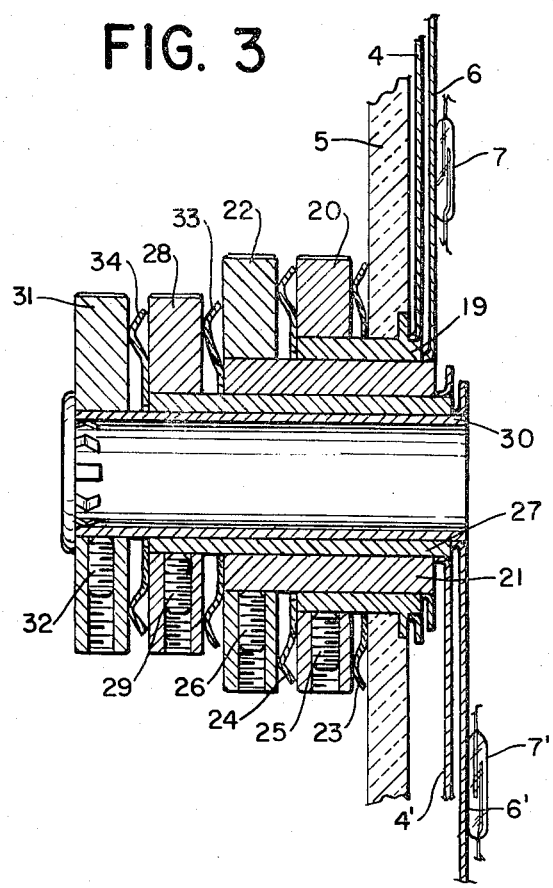
FIG. 3 is a cross-sectional view of the mounting structure for the pointers and signaling mechanism of the gauge.
Figure 4:
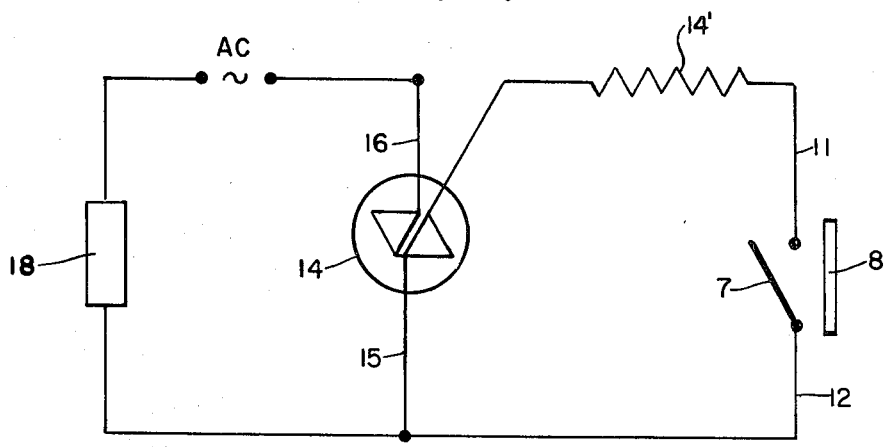
FIG. 4 is a circuit diagram of the switching circuit.

The mounting of the set pointer 4 and associated vane 6 is most clearly shown in FIG. 3. The set pointer 4 is fixed to one end of a shaft 19 extending centrally through the lens 5. The shaft is rotatably secured to the lens and at its outer end is provided with a manually operable knob 20. Turning of the knob controls the movement of the set pointer 4 along the dial. For mounting the vane 6 associated with the set pointer, a second shaft 21 is provided. This shaft is disposed concentrically and rotatably within the shaft 19; and at its outer end, is provided with a knob 22. A friction washer 23 is positioned between the lens 5 and the knob 20. Also, a friction washer 24 is positioned between the knobs 20 and 22. The knobs 20 and 22 are held on their supporting shafts by positioning means in the form of set screws 25 and 26. With the mounting construction of the set pointer 4 and associated vane 6, independent rotation thereof may be effected by turning the two knobs.

In operation, the initial setting of the gauge described above is as follows. The set pointer 4 is first set at the desired value along the dial. The vane member 6 carrying the reed switch is moved clockwise from the position shown in FIG. 1 to a location out of the magnetic field which will be present when the indicating pointer underlies the set pointer. Pressure is then supplied to the gauge to move the indicating pointer to a position directly underlying the set pointer. Next, the vane 6 is moved slowly counterclockwise until the magnetic field of the magnet 8 carried by the indicating pointer causes actuation of the reed switch. With subsequent use of the gauge set in this manner, precise actuation of the signaling mechanism when the position of the indicating pointer coincides with that of the set pointer is assured.

Once the required relationship between the reed switch on the vane and the set pointer is determined as described above, the switch and set pointer may be locked together against relative rotation so that the set pointer may be moved along the dial without requiring resetting of the reed switch. With reference to FIG. 3, this is accomplished by axially pressing the knob 22 toward the knob 20 until the friction washer 24 frictionally locks the two together. In this position, the set screw 26 is tightened to fix the knob 22 in this position. Subsequent rotation of either knob 20 or 22 will then cause simultaneous movement of the reed switch 10 and associated set pointer 4.

In some situations, it is desirable to lock the set pointer against any rotation. For this purpose, the knob 20 is pressed axially toward the lens 5 to frictionally lock it thereto by means of the friction washer 23. In this position, the set screw 25 is tightened. This positioning of the knob 20 may be effected before the position of the reed switch 10 is fixed relative to the set pointer 4.

As previously indicated, the gauge includes a plurality of separate set pointers and reed switches. FIG. 1 shows one additional set pointer 4' and reed switch 10' while FIG. 3 most clearly shows the mounting of the set pointer 4' and the vane 6' carrying the reed switch 10'. The set pointer 4' is fixed to the inner end of a shaft 27 mounted concentrically within the shaft 21 for rotation relative to shaft 21. A control knob 28 is fixed to the outer end of the shaft 27 by means of a set screw 29. The vane 6' associated with the set pointer 4' is fixed to the inner end of still another shaft 30. This shaft is mounted concentrically and rotatably within the shaft 27 and at its outer end is provided with a control knob 31 fixed thereto by means of a set screw 32. A friction washer 33 is disposed axially between the knobs 22 and 28 and a friction washer 34 is disposed axially between the knobs 28 and 31. As seen from FIG. 3, the knobs 28 and 30 are radially smaller than the underlying knobs 20 and 22. This permits grabbing and turning of each pair of knobs without interference from the other pair.

In a manner similar to that described above in relation to knobs 20 and 22, the knobs 28 and 31 may be fixed for simultaneous rotation. Also, the knobs 28 and 31 may be fixed for simultaneous rotation with the knobs 20 and 22. This latter result is produced by pressing the knob 28 toward the knob 22. When all knobs are fixed against rotation relative to each other, the set pointers 4 and 4', acting as low limit and high limit pointers, may be moved with one turning operation to change the location of the high and low limits but without changing the spread within which the pressure being controlled may fluctuate.

As an example of use of the gauge employing the signaling mechanism of the present invention, the gauge may be connected into a system in which the pressure of a fluid is to be maintained between prescribed limits. With the high limit and low limit pointers set at the desired levels, the pressure gauge indicating pointer will fluctuate between these points as the pressure of the system varies. When the low limit of pressure is reached, the signaling mechanism associated with the low limit set pointer will automatically be actuated. With the signaling mechanism being connected to a pump, the pump may be caused to operate to increase the pressure in the system until the high limit is reached. At this point, the reed switch associated with the high limit pointer 4 will be actuated to shut off the pump. With the construction of the signaling mechanism of the present invention, a precise, trouble-free control of the pump is assured.

I claim:

1. An improved signaling mechanism in a dial type indicating mechanism such as a gauge for indicating the value of a variable supplied to the gauge, the gauge having a dial showing the values of the variable, an indicating pointer mounted for movement along said dial in response to changes in the variable, and a set pointer mounted for movement along said dial for setting at chosen values of said variable as indicated by said dial, the improved signaling mechanism being operable to actuate an electrical circuit upon movement of said indicating pointer along said dial to the location of said set pointer and comprising:

a. a switch support member mounted for movement along said dial independently of said set pointer;

b. a reed switch mounted on said support member for cooperating with said set pointer, said reed switch being adapted to be actuated upon entering the magnetic field of a magnet; and c. a switch actuating magnet mounted on said indicating pointer for actuating said reed switch as said indicating pointer moves to the location of said set pointer.

2. In the gauge according to claim 1, the improved signaling mechanism further comprising:

a. locking means for locking said set pointer to said switch support member for movement together along said dial.

3. In the gauge according to claim 1, the improved signaling mechanism further comprising:

a. manually operable control means disposed outwardly of said dial for moving said set pointer and switch support member along said dial independently of each other.

4. An improved signaling mechanism in a dial type indicating mechanism such as a gauge for indicating the value of a variable supplied to the gauge, the gauge having a dial showing the values of the variable, an indicating pointer mounted for movement along said dial in response to changes in the variable, and a set pointer mounted for movement along said dial for setting at chosen values of said variable as indicated by said dial, the improved signaling mechanism being operable to actuate an electrical circuit upon movement of said indicating pointer along said dial to the location of said set pointer and comprising:

a. a switch support member mounted for movement along said dial;

b. a reed switch mounted on said support member, said reed switch being adapted to be actuated upon entering the magnetic field of a magnet;

c. a switch actuating magnet mounted on said indicating pointer for actuating said reed switch as said indicating pointer moves to the location of said reed switch;

d. a front lens on said gauge covering said dial;

e. a first shaft extending through said lens and rotatably mounted thereon, said set pointer being fixed to the inner end of said first shaft;

f. a first manually operable knob fixed to the outer end of said first shaft for controlling movement of said set pointer along said dial;

g. a second shaft extending through said lens concentrically to said first shaft, said second shaft being mounted rotatably relative to said first shaft and fixedly holding said switch support member at its inner end; and h. a second manually operable knob fixed to the outer end of said second shaft axially outwardly of said first knob for controlling movement of said switch support member along said dial.

5. In the gauge according to claim 4, the improved signaling mechanism further comprising:

a. locking means for selectively locking said first and second knobs together against relative rotation.

6. In the gauge according to claim 5, the improved signaling mechanism wherein:

a. said second knob is positionable at selected axial distances from said first knob;

b. the locking means includes:

1. a friction washer mounted axially between said first and second knobs, and 2. knob positioning means for selectively fixing the axial position of said second knob relative to said first knob with said friction washer locking the knobs against relative rotation.

7. In the gauge according to claim 6, the improved signaling mechanism wherein:

a. the switch support member is a vane disposed axially between said dial and said set pointer and is radially shorter than said set pointer; and b. said reed switch is mounted on the underneath surface of said vane.

8. In the gauge according to claim 6, the improved signaling mechanism further comprising:

a. a friction washer mounted axially between the lens and said first knob; and b. knob positioning means for selectively fixing the axial position of said first knob relative to said lens with the friction washer therebetween locking the first knob against rotation relative to said lens.

9. In the gauge according to claim 8, the improved signaling mechanism wherein:

a. said knob positioning means comprises set screws extending radially through the first and second knobs for selective engagement with said first and second shafts, respectively.

10. In the gauge according to claim 5, having a second set pointer, the improved signaling mechanism further comprising:

a. a second switch support member and reed switch mounted for movement along said dial;

b. a third shaft extending through said lens concentrically to said first and second shafts and mounted for rotation relative thereto, said third shaft fixedly holding said second set pointer at its inner end;

c. a third knob fixed to the outer end of said third shaft axially outwardly of said second knob for controlling movement of said second set pointer along said dial;

d. a fourth shaft extending through said lens concentrically to said first, second and third shafts and mounted for rotation relative thereto, said fourth shaft fixedly holding said second switch support member at its inner end;

e. a fourth knob fixed to the outer end of said fourth shaft axially outwardly of said third knob for controlling movement of said second switch support member; and f. second locking means for selectively locking said third and fourth knobs together against relative rotation.

11. In the gauge according to claim 10, the improved signaling mechanism wherein:

a. said fourth knob is positionable at selected axial distances from said third knob;

b. the second locking means includes:

1. a friction washer mounted axially between said third and fourth knobs, and 2. knob positioning means for selectively fixing the axial position of said fourth knob relative to said third knob with the friction washer therebetween locking the third and fourth knobs against relative rotation.

12. In the gauge according to claim 11, the improved signaling mechanism further comprising:
a. a friction washer mounted axially between said second and third knobs; and
b. knob positioning means for selectively fixing the axial position of said third knob relative to said second knob with the friction washer therebetween locking said second and third knobs against relative rotation.

13. In the gauge according to claim 10, the improved signaling mechanism wherein:
a. the third and fourth knobs are radially smaller than the first and second knobs.

* * * * *

PO-1050
(5/69)

UNITED STATES PATENT OFFICE
CERTIFICATE OF CORRECTION

Patent No. 3,683,135                    Dated August 8, 1972

Inventor(s)   Robert P. Oliver

It is certified that error appears in the above-identified patent and that said Letters Patent are hereby corrected as shown below:

Column 8, line 3, "claim 10" should read --claim 12--.

Signed and sealed this 15th day of May 1973.

(SEAL)
Attest:

EDWARD M.FLETCHER,JR.            ROBERT GOTTSCHALK
Attesting Officer                 Commissioner of Patents